Dec. 2, 1969  E. L. BOYD  3,481,184
CORE TESTING METHODS AND APPARATUS
Filed July 14, 1967

INVENTOR
EDWARD L. BOYD

ATTORNEYS

United States Patent Office 3,481,184
Patented Dec. 2, 1969

3,481,184
CORE TESTING METHODS AND APPARATUS
Edward L. Boyd, Peekskill, N.Y., assignor to International Business Machines Corporation, Armonk, N.Y., a corporation of New York
Filed July 14, 1967, Ser. No. 653,398
Int. Cl. G01n 29/04
U.S. Cl. 73—67.2                 9 Claims

ABSTRACT OF THE DISCLOSURE

Square loop magnetic cores are tested by degaussing cores, supporting cores preferably by air levitation, applying a range of radio frequencies and vibrating the cores, searching for resonance evidenced by changing magnetic fields as the cores vibrate, applying an external magnetic field, vibrating the cores, and searching for resonance. Cores which produce shifting magnetic fields indicative of residual magnetism after degaussing are rejected as faulty. Cores which resonate after an external magnetic field has been applied are accepted. Radio frequency vibration driving force is applied within a narrow band of frequencies, and resonance is determined by detecting changing magnetic fields produced by the core.

---

Core testing methods and apparatus using demagnetizing equipment, resonance detectors, magnetizing equipment and further resonance detectors are described herein.

This invention generally concerns methods and apparatus for testing magnetic devices to screen good devices from poor ones. More particularly, this invention concerns the testing of magnetic memory cores in a manner which indicates as acceptable only those cores which will have suitable operational characteristics.

The present invention makes use of the self-excited acoustic resonances of magnetic memory cores. The testing is effected as an assembly line procedure without the necessity of passing wires through holes in the cores.

In the use of magnetic memory cores, the pulsing of the cores or the frequency at which the cores are pulsed, as well as the incidence of rise times and fall times, and the duration and magnitude of the pulses are all inputs which influence vibrations within the cores. Natural frequencies of the cores are the result of particular forms and dimensions and materials of construction of the cores. When the cores are influenced to vibrate at their natural frequencies, resonance or ringing occurs. The resonance or ringing may generate false signals and may be responsible for spurious inputs or outputs to or from memories.

When the natural frequencies of all magnetic memory cores within a system can be predicted within a precise range, it is possible to design systems to avoid producing undesirable resonances in the memory cores.

Heretofore satisfactory core testing methods have simulated operating conditions for the magnetic memories. Threading of wires through holes in the cores was required. Cores are extremely small, and their dimensions render the wiring costly and time consuming. When cores were rejected using old test procedures, the expense and time of wiring were lost. Moreover, a wire through the center of a core may have altered the magnetism of the core and may have given incorrect accept and reject indications. Besides adding costs and time to the construction of the item to be tested, test procedures were time consuming for cores having central wires. Conventional inductance tests were unsatisfactory.

Cores having acceptable performance have been found to resonate upon the application of frequencies within a narrow range. This invention makes use of self excited acoustic resonance of magnetic memory cores to screen good cores from poor ones without the necessity of passing wires through holes in the cores.

Magnetic memory cores may be constructed in the form of toroids which have four modes of vibrations: transverse vibrations in the plane of the core, flexing of the core toward and away from the central opening; transverse vibrations perpendicular to the plane, flexing the core in a dished manner; longitudinal vibrations circumferentially about the core; and torsional vibrations, twisting the plane of the core. In a preferred form of the invention, it is useful to test the cores for resonance in either or both of the transverse modes of vibration.

There are three parameters of acoustic resonance which are affected by magnetic properties of a memory core-applied frequency, amplitude of resonance and bias field. The first parameter is the frequency at which resonances occur. The dominant factor in the frequency appears to be the mean radius of the core. There are important secondary factors such as the elastic moduli which depend upon the chemical and ceramic processing in the manufacture of the core. As a rule of thumb, the higher the firing temperature, the higher the resonant frequency for a given mode of vibrations. The firing schedule also affects the relative frequencies of the various vibrational modes. Experience gained by observing many rejected and acceptable cores indicates that for acceptable cores, resonance in each mode lies within a narrow frequency band. The narrow band, for example, is approximately 150 kilocycles wide in one type of core. The narrow range of frequencies at which acceptable cores resonate may be because the mechanical effects which determine elastic moduli are the same ones which determine polycrystalline magnetostriction.

The flux configuration of a core may be measured by amplitude of resonance in conjunction with an applied D.C. field. Flexing of a plane of a core is strongly affected by a D.C. field within the plane of the core. It has been found that amplitude peaks at different field strengths for acceptable cores than for rejected ones.

A combination of applied frequency which causes resonance and amplitude of resonance as well as field bias in which resonance peaks can be calculated or can be developed empirically for acceptable cores of every design specification.

In order to test the cores for accepting cores which will produce good operational characteristics and for rejecting poor cores, it is desirable to establish a D.C. field of a strength which produces peak resonance in known good cores similar in design and specification to cores under test. Radio frequencies are applied to the cores in a narrow range within which transverse resonance is experienced by known good cores having dimensions and materials similiar to the cores under test. Resonance of the cores is then sensed with a resonance detector which may be a super regenerative receiver. Upon determining that resonance with an appropriate amplitude has occurred, the core is accepted. If the appropriate parameters have not been quantitatively met, the core is reiected.

The resonance detection may be done by sweeping the frequency of a small amplitude radio frequency current and observing either the loss or the phase angle, the imaginary or real susceptability of the core, as a function of frequency. Since RF current is kept small, the test creates only a minor perturbation on the system. Resonance may be observed as a function of D.C. bias or in the remanent state.

Resonance test equipment art is well developed but does not teach that ferrite cores have properties that make resonance tests useful. Manufacturing tolerances cause core sizes to vary by plus or minus 10%. One would expect that resonant frequencies would vary with core sizes, and that any kind of resonant frequency test would be ineffective, because the frequency range attributable to variations in size would be greater than the frequency difference between good cores and bad cores. Surprisingly, the resonant frequency varies only about 1% for the 10% size variation and this is smaller than the resonance frequency difference between good cores and bad cores. The longitudinal mode as opposed to the transverse mode is significant in achieving the effect.

One objective of this invention is the provision of a method for testing magnetic devices comprising magnetizing the devices, applying radio frequencies to the devices and detecting resonance of the devices.

This invention has as another objective the provision of testing procedures for magnetic memory cores in which the cores are demagnetized and tested for resonance and are subsequently placed in a D.C. field and are again tested for resonance by sweeping the cores with radio frequencies within a narrow band and sensing vibrations and resonance of the core.

A further objective of this invention is the provision of testing apparatus including demagnetizing equipment, resonance sensing equipment, magnetizing equipment and other resonance sensing equipment for predetermining magnetic parameters and operational characteristics of magnetic memory cores.

The foregoing and other objectives, features and advantages of this invention will be apparent from the following more particular description of preferred embodiments of the invention as illustrated in the accompanying drawings in which.

Figure 1:
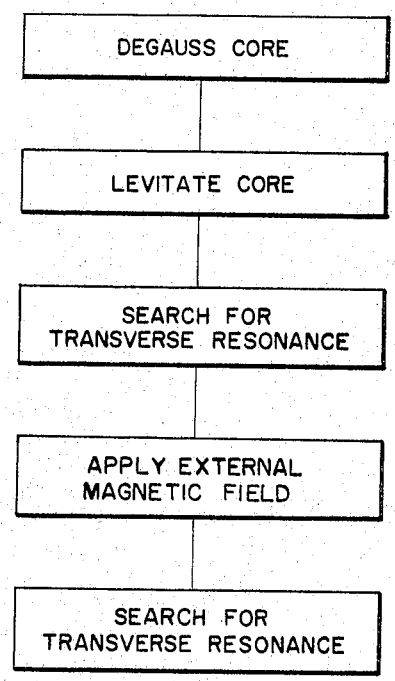
FIGURE 1 is a chart of steps for testing magnetic memory cores.

Referring to the drawings, FIGURE 1 illustrates a preferred method for testing a magnetic memory core. The first step in the process involves degaussing the care. Next, the core is levitated or stood on its edge and searching for either or both transverse resonances is performed. If a transverse resonance is discovered during the demagnetized state which indicates that a faulty core has improperly retained its magnetized state, the core may be rejected.

An external D.C. field of a known strength is applied to the core, and the core is swept with a narrow band of radio frequencies. If the core resonates at an appropriate magnitude as sensed in a search for transverse resonance, the core is accepted. The D.C. field strength, the band of radio frequencies and the magnitude of resonance searched for are predetermined quantities which are established for each core configuration and material based up calculations or upon empirical data taken from cores which are known to be operationally acceptable.

Figure 2:
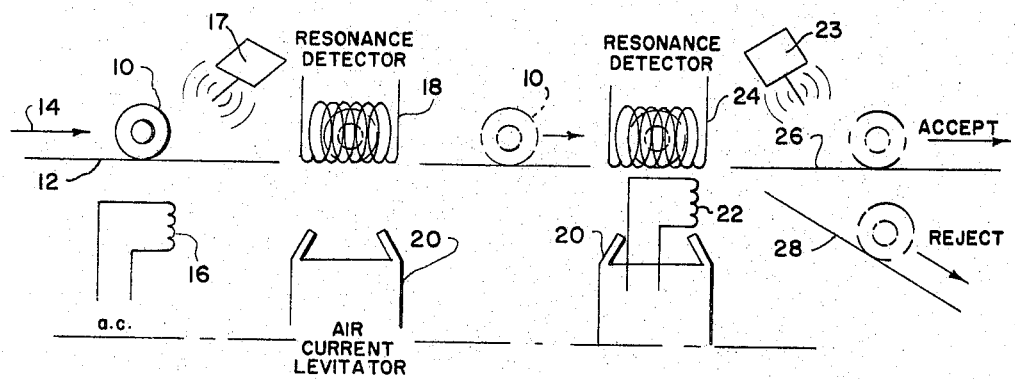
FIGURE 2 is a schematic representation of core testing apparatus.

In FIGURE 2 a core to be tested is indicated by the numeral 10. The core 10 is supported on its edge by a surface 12 and it is propelled along surface 12 in the direction indicated by arrow 14, continuously or in appropriate increments by propelling means for relatively moving the core with respect to field-producing and resonance detecting means. In its initial position, core 10 is degaussed by a strong A.C. field produced by coil 16 demagnetizing cores 10. In a second position shown in phantom lines, the care is passed into a resonance detector to determine whether the randomly magnetically oriented core resonates at certain applied frequencies from radio frequency generator 17. If it does, the coil may be passed directly to reject line 28.

Air current levitators 20 are preferably used to support the cores within coils 18 and 24 of the resonance detectors. Although cores 10 may assume any position in coil 18, it is desirable to support core 10 on edge as shown in the drawing within coil 24 so that the field produced by D.C. coil 22 will be parallel to the plane of core 10. Radio frequencies from radio frequency generator 23 in a limited range are applied to core 10 to vibrate the core within coil 24 of a resonance detector, which may be a super regenerative receiver, and the detector indicates whether the core has resonated at an acceptable level. Cores which have resonated at an acceptable level upon the sweep of frequencies are passed along plane 26 to be collected with accepted cores. Cores which have not resonated at an acceptable level are rejected in line 28.

The relationship between transverse vibration and core flaws also holds true when the cores are strung on a wire. Memory cores are coventionally located at the intersection of a matrix of wires. The cores can be advantageously tested after the first set of wires has been threaded through the cores. In this method, the wire can be used to apply the magnetic fields required for the test or to pick up the signals that accompany the mechanical vibration, or both.

When the cores are strung on a wire for the test, the cores can also be tested for their longitudinal resonance. The relationships between the longitudinal vibrations and core flaws is similar to the relationship explained for transverse vibrations.

While the invention has been particularly shown and described with reference to preferred embdoiments thereof, it will be understood by those skilled in the art that various changes in form and detail may be made therein without departing from the spirit and scope of the invention.

What is claimed is:

1. The method for testing qualities and properties of square loop magnetic memory cores for determining apparent and latent defects in structure of the memory cores independently of their mode of operation comprising:

continuously supplying to a testing line square loop magnetic memory cores having predetermined maximum remanent states and zero remanent states, supporting the memory cores in the testing line, applying to the memory cores a magnetic field to give the memory cores a predetermined first maximum magnetized state, applying a narrow predetermined range of radio frequencies to the magnetized memory cores thereby vibrating the cores which are in the predetermined maximum magnetized state, and producing changing magnetic fields with the vibrating cores in a magnetized state, detecting changing magnetic fields produced by the cores as the cores vibrate and resonate, and thereby sensing resonance of the magnetic memory cores, accepting only those memory cores which resonate in the narrow predetermined applied radio frequency range, and which thereby indicate freedom from apparent and latent defects which make a core unsatisfactory in the normal mode of operation, and rejecting memory cores which do not resonate in the predetermined applied radio frequency range.

2. The method for testing qualities and properties of square loop magnetic memory cores for determining apparent and latent defects in structure of the memory cores independently of their mode of operation comprising:

continuously supplying to a testing line square loop magnetic memory cores having predetermined maximum remanent states and zero remanent states, supporting the memory cores in the testing line, degaussing the cores, thereby setting zero remanent state in the non-defective cores, sweeping the cores with radio frequencies of a predetermined range, thereby vibrating the cores and producing changing magnetic fields by cores exhibiting residual magnetism, rejecting cores exhibiting residual magnetism following degaussing, applying to the memory cores a field to give the memory cores a predetermined first maximum magnetized state, applying a narrow predetermined range of radio frequencies to the magnetized memory cores, thereby vibrating the cores and producing changing magnetic fields produced by the vibrating cores which are in the predetermined maximum magnetized state, detecting changing magnetic fields produced by the cores as the cores vibrate, and thereby sensing resonance of the magnetic memory cores, accepting only those memory cores which resonate in the narrow predetermined applied radio frequency range, and which thereby indicate freedom from apparent and latent defects which make a core unsatisfactory in the normal mode of operation, and rejecting memory cores which do not resonante in the predetermined applied radio frequency range.

3. The method for testing a square loop magnetic memory core for determining apparent and latent structural defects in the memory core by treating the core independently of its normal mode of operation comprising:

supporting a core on edge in a testing line, passing the core adjacent a degaussing field, applying frequencies in a predetermined range to the core, thereby vibrating a core aand producing changing magnetic field in a core having residual magnetism while passing the core adjacent a changing magnetic field detector, sensing changing magnetic fields produced by the core, rejecting a core producing a changing magnetic field, magnetizing the core, applying a narrow predetermined range of frequencies to the core, thereby vibrating a core having a predetermined maximum magnetized state and avoiding vibrating a core having less than a predetermined maximum remanent state, passing the core adjacent a detector for detecting changing magnetic field produced by the core, sensing degree of changing magnetic field and thereby determining resonance of the core, accepting a core which resonates in the applied frequency range and which produces a predetermined degree of changing magnetic field in which known acceptable cores resonate, and rejecting a core which avoids resonating in the applied frequency and which fails to produce a predetermined degree of changing magnetic field.

4. The method for testing a magnetic memory core described in claim 3, wherein said supporting step includes supporting the core on edge when passing the core adjacent vibration detectors.

5. The method for testing a magnetic memory core described in claim 3, wherein said supporting step comprises levitating the core with air currents while passing the core adjacent vibration detectors.

6. The method for testing square loop annular magnetic memory cores for determining apparent and latent structural defects in the memory core by treating the core independently of its normal mode of operation comprising:

supporting memory cores having selective levels of remanence on edge in an air stream, degaussing the cores with a degaussing field, applying radio frequency waves transversely to the cores in a narrow range of frequencies, thereby transversely vibrating the cores, and producing changing magnetic fields with cores which faultily retain magnetization, detecting changing magnetic fields produced by the cores with a first detector, and thereby sensing transverse resonance of the cores, rejecting cores that produce changing magnetic fields in the first vibration detector, magnetizing the cores with a magnetic field, thereby establishing a preselected remanence level in the cores, applying to the cores a range of radio frequencies in which known acceptable cores resonate, thereby transversely vibrating the cores, resonating good cores and producing changing magnetic fields, detecting changing magnetic fields produced by the cores with a second vibration detector, thereby sensing transverse resonance of the cores, rejecting cores which do not resonate in the second vibration detector, and accepting cores which resonate only in the second vibration detector.

7. Apparatus for testing square loop magnetic memory cores for determining apparent and latent structural defects in memory cores independent of their mode of operation comprising:

supporting means to support the memory cores, square loop magnetic memory cores disposed on the supporting means, degaussing field-producing means adjacent memory cores on the supporting means directing a degaussing field to the memory cores, first frequency producing means and first changing magnetic field detecting resonance-detector means adjacent the memory cores on the supporting means and adjacent the degaussing field producing means, for vibrating the memory cores and for producing changing magnetic fields by cores improperly retaining magnetization, and for detecting changing magnetic fields so produced, second field-producing means spaced from the degaussing field-producing means and the first resonance-detecting means, said second-field-producing means providing a desired predetermined remanent state of magnetization in the memory cores, second frequency producing vibrating means mounted adjacent the supporting means for directing frequencies to the memory cores in a range of frequencies in which known acceptable memory cores resonate, thereby resonating acceptable cores and producing changing magnetic fields therefrom, second changing magnetic field detecting resonance-detector means mounted adjacent the second field-producing means for detecting resonance of the memory cores, propelling means cooperating with the supporting means for relatively moving the devices with respect to the field-producing means and resonance-detector means, the propelling means having accepting means for accepting cores which resonate adjacent the second resonance detector and for rejecting memory cores which avoid resonating adjacent the second detector, and for rejecting memory cores which resonate adjacent the first resonance detector.

8. The apparatus of claim 7 wherein the supporting means comprises an air stream within the resonance-detecting coils.

9. The apparatus of claim 7 wherein the second resonance-detecting coil is positioned within the field produced by the second field-producing coil.

References Cited

UNITED STATES PATENTS

| | | | |
|---|---|---|---|
| 2,896,446 | 7/1959 | Lewis | 73—67.2 |
| 2,221,570 | 11/1940 | Brace et al. | 324—37 |
| 2,716,887 | 9/1955 | Smith | 73—67.2 |
| 3,044,290 | 7/1962 | Rawding | 73—67.2 |

RICHARD C. QUEISSER, Primary Examiner

JOHN R. FLANAGAN, Assistant Examiner